JOHN. W. HYATT Jr.
IMP.D COATING PROCESS

No. 114945. Patented May 16 1871

Witnesses
Inventor
John W. Hyatt, Jr.
by Daniel S. Hyatt, attorney

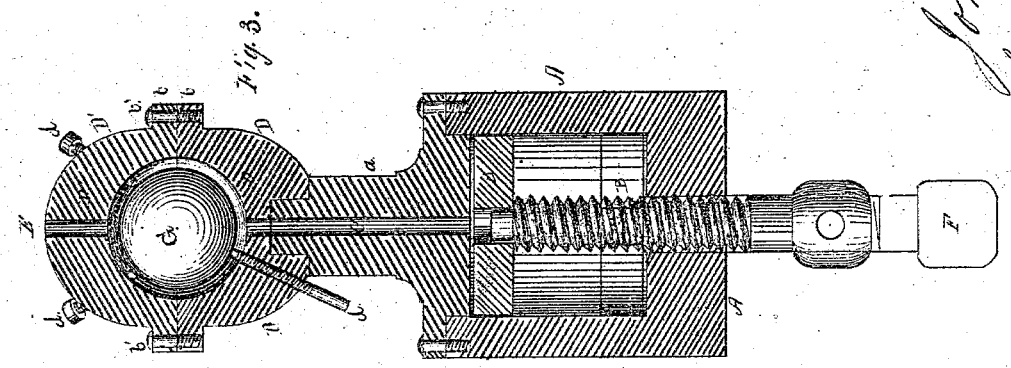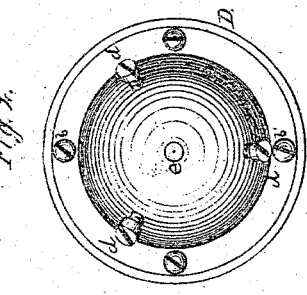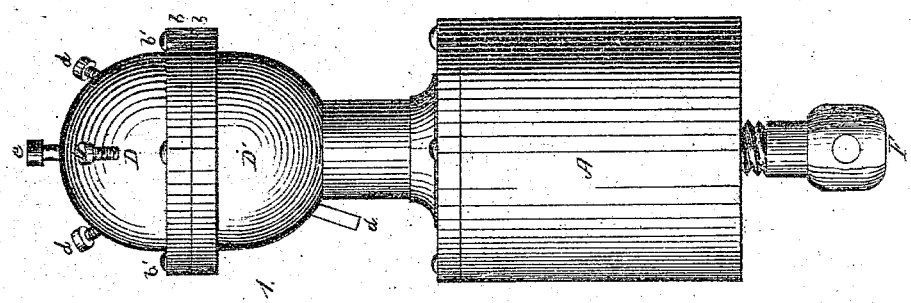

UNITED STATES PATENT OFFICE.

JOHN W. HYATT, JR., OF ALBANY, NEW YORK.

IMPROVEMENT IN PROCESSES OF COATING BILLIARD-BALLS, KNIFE-HANDLES, AND OTHER ARTICLES.

Specification forming part of Letters Patent No. 114,945, dated May 16, 1871.

*To all whom it may concern:*

Be it known that I, JOHN W. HYATT, Jr., of the city and county of Albany and State of New York, have invented a new and Improved Process of Coating and Beautifying the Surfaces of Billiard-Balls, Knife-Handles, and other articles; and I do hereby declare that the following is a full, clear, and exact description thereof, reference being had to the accompanying drawings, making part of this specification, in which—

Figure 1:
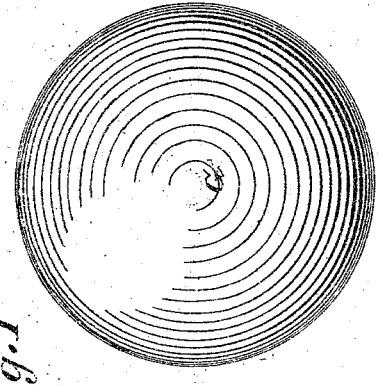
Figure 2:
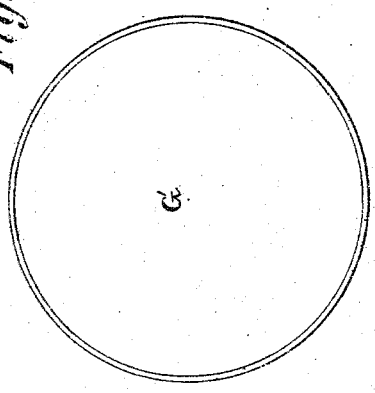
Figure 3:
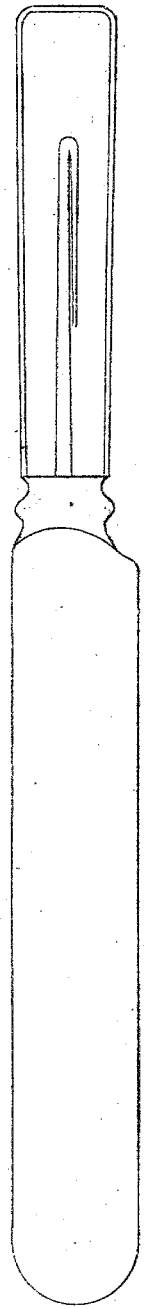
Figure 4:

Figure 1, Sheet 1, is a sectional view of a ball which has been coated by my improved process. Fig. 2, Sheet 1, is a sectional view of a knife-handle similarly coated. Fig. 1, Sheet 2, is a perspective view of my molding apparatus. Fig. 2, Sheet 2, is a top view of the same. Fig. 3, Sheet 2, is a vertical section through the center.

This invention is designed especially for beautifying and rendering very hard and durable the surfaces of articles which are made of substances or compounds not susceptible of receiving or retaining a fine color and polish; and it consists in the means used for holding the article to be coated centrally in the mold, and in giving a vent to the mold while the coating is being forced upon the article in the mold.

The following is a description of the best means known to me for carrying my invention into effect.

In the accompanying drawings, I have represented a ball, and also a knife-handle, having the surfaces prepared by my improved process; but I do not confine my invention to these two articles alone, as a great variety of articles or objects, made of an inferior substance, may be similarly treated and their surfaces beautified, and to represent a superior substance, as ivory or the most expensive woods.

I prepare the collodion by mixing sufficient alcohol and ether with gun-cotton to make a thick plastic mass, something like the consistency of dough, and then mold it upon the article to be coated therewith.

To enable others skilled in the art to make and use my invention, I will proceed to describe its construction and operation.

The apparatus which I construct for the purpose of molding the collodion upon the surfaces of articles, consists of a cylinder, A, plunger, B, nozzle or conduit C, mold D, set-screws or adjustable pins $d\ d\ d\ d$, and vent E, and screw F. I construct the whole apparatus of any suitable metal or other material possessing the requisite strength. It should be strong enough to withstand a pressure of many tons per square inch.

The cylinder A should be made of sufficient capacity to contain all the plastic collodion required for molding during an entire day, or such other period as may be desired. The cylinder is made as nearly air-tight as possible, so as to prevent the collodion from evaporating until it has been molded upon the article to be coated.

The plunger B should fit closely within the cylinder A, so that when the collodion is placed inside and between the plunger B and the head-piece $a$, it will not pass between the plunger and walls of the cylinder during the process of molding. The mold D should be made tight in its joints, so that none of the collodion can be forced through the joints.

The set-screws or adjustable pins $d\ d\ d\ d$ should be as small in the parts which pass within the mold as possible, so that they have sufficient strength to hold the article to be coated in proper place while the collodion is being forced around its surface. On this account, in most instances I make these pins of steel. When made of steel and very small, say, one-eighth of an inch in diameter, or less, they do not displace much of the composition, and when they are withdrawn, the composition can easily be forced into the spaces previously occupied by the pins.

In the mold D I construct a vent, E, and locate it as nearly opposite the inlet or conduit C as possible, (according to the shape of the mold employed,) so that the mold will be filled as completely as possible before the composition reaches the vent. I make a plug, $e$, or any other equivalent device, with which to close the vent, after a small quantity of the collodion has been forced through, and after it is certain that the article in the mold has become completely covered with the collodion.

The plunger B may be operated in various ways, one of which is represented in the drawing by the screw F, the thread of which passes through the bottom part of the cylinder A, in which is cut a corresponding screw-thread; or the plunger B may be operated by hydraulic power, steam-power, lever-power, or any other of the well-known methods of operating plungers or pistons in cylinders.

The mold is constructed in two parts, D and D', whenever the article to be molded is of a permissible shape. Articles of irregular form will require a suitable number of parts to the mold. These parts are held together by flanges $b$ $b$, attached to each other by screws $b'$ $b'$; or the parts of the mold may be held together by any suitable or equivalent method.

The following is my plan of operating my invention: I prepare the collodion by mixing sufficient alcohol and ether with gun-cotton to make a thick plastic mass, something like the consistency of dough. By mixing with the collodion any pigment or coloring matter that is soluble in alcohol or other solvent of gun-cotton, the coating of the object may be given any desired color, shade, or tint; or, if desirable, the coloring matter may be applied after the coated article is finished and polished. A simple and quick process of coloring the coating is to immerse the article into a coloring solution before the collodion coating becomes perfectly dry and hard.

In the accompanying drawings I have represented my method of molding collodion upon the surface of a ball, G; but I do not confine my invention to the method of coating that article, as I wish to use my method of molding collodion by applying it to a great variety of articles or objects made of an inferior material having collodion molded upon their surfaces.

In applying the collodion compound by my method, I take a ball, as G, Fig. 3, or any other article which may be made of an inferior substance or compound, and place such article into a mold of the proper form, as D.

If the object be spherical or of such other form that it cannot be held in proper position to be coated in the mold by contact with any part or parts thereof without interfering with the coating compound, I hold such ball or object in proper place within the mold by a suitable number of adjustable pins or set-screws, as $d$ $d$ $d$ $d$. The collodion compound, which is previously placed within the cylinder A, is then forced by the plunger B through the nozzle or pipe E into the mold D and around the ball G, or other object, to be coated in the mold. If the article to be coated be a ball or article of which I desire to coat the entire surface, I provide a vent, E, in the mold to allow the air and the parts of the compound that have been exposed to the air in the mold to be completely expelled from the mold, and to allow the composition as it is forced toward and through the vent to completely unite into one homogeneous surface around said article to be coated.

The ether and alcohol in the collodion are very volatile, and if any part of the collodion be exposed to the air even for a short time the volatile elements will evaporate and leave the surface harder than the inside of the mass, so that two or more parts of such surfaces will not readily unite when brought into contact.

After the mold has been completely filled with the composition, and a sufficient quantity has escaped through the vent to render it certain that the object has become completely coated, I close the vent by inserting the plug $e$. I then retract the adjustable pins or set-screws $d$ $d$ $d$ $d$ until their ends or points are even with the inner surface of the mold. An increased pressure, if that already on be not sufficient, will cause the composition to completely fill the spaces previously occupied by the ends of the pins or set-screws, so that the balls or other articles will then be completely, evenly, and perfectly coated with the composition. The coated article is then taken out of the mold, and after having dried sufficiently is smoothed and polished upon its surface.

The cylinder serves two purposes: one is to confine the plastic compound in a convenient manner, so that it can be easily forced into the mold, and the other is to confine the plastic compound of collodion into an air-tight receptacle, so that no evaporation of its volatile elements can take place after such compound has been placed within said cylinder and before it has been forced into the mold and around the article to be coated.

I achieve the best results by mixing the collodion as thick as it will flow, and its particles cohere under pressure. When the compound is made of this thick plastic consistency, it requires the application of a very heavy pressure to force it into the mold, and perfectly coat the article therein. To accomplish this I apply power to the plunger B by means of the screw F, or I use hydraulic power, steam-power, or any of the convenient and well-known methods of forcing plungers in cylinders.

If it is desirable to render the coating of collodion tougher and more adhesive than it naturally is, a drying-oil may be added to it. The collodion will adhere much better if the surface upon which it is to be applied is first primed with linseed-oil, glue, or some other resinous gum or adhesive substance.

I am aware that many articles have been made entirely of solidified collodion, but for many things that material is too expensive, and also, on account of its great shrinkage, it is very difficult to mold into any desirable shape, except upon wood or some other substance previously formed. I am also aware that collodion has been applied as a coating for articles by dipping such articles into a solution of collodion and letting it dry thereon; but an article coated by dipping is much inferior to one coated by molding, because the latter is much stronger and durable. It is also more expensive to apply collodion as a coating by dipping than by molding, because of the increased proportions of alcohol and ether required to render the gun-cotton sufficiently thin in consistency to allow articles to be dipped therein. The purer the qualities of the alcohol, ether, and gun-cotton used in my process, the better the result.

If the article or object which it is desired to coat under my improved process be made of a substance capable of being softened by moderate heat, such object or article may be placed in heated dies or molds, adapted to the purposes, after the coating upon it has nearly or quite hardened, and then subjected to considerable pressure, which will produce a smooth surface and bring out the fine lines or figures in such object. The application of pressure and heat at the same time to an object coated as above described will also expel the globules of air from the coating and render it more solid and firm.

The ball G, represented in section in the accompanying drawings, may be made of wood or of any other substance, and its surface coated, polished, and colored, as herein described, and the knife-handle M, also shown in the accompanying drawings, may be made of wood, bone, or other inferior substance, and coated, polished, and shaded or colored to give the appearance of ivory or valuable substance. Owing to the toughness and other properties of collodion, it will shrink closely and adhere firmly to a solid substance, and will not be liable to crack off or become marred by rough usage; and as this substance is not materially injured by moderate degrees of heat, it is well adapted for a variety of objects which are frequently subjected to heat, such as handles to table-knives and other articles. Among the articles I would mention are whip-stocks, canes, umbrella-sticks, pen-holders, door-knobs, brush handles and backs, dental and other tool-handles, &c., which may be coated as described.

I do not claim, generally, the covering or facing of articles with pyroxylene, but rather my methods or processes of doing the same.

Having thus described my invention, what I claim as new, and desire to secure by Letters Patent, is—

1. The adjustable pins or set-screws $d\ d\ d\ d$, in combination with the mold D, substantially as described.

2. The vent E, in combination with the mold D, adjustable pins $d\ d\ d\ d$, cylinder A, and plunger B, substantially as described.

JOHN W. HYATT, Jr.

Witnesses:
ROBT. D. RADCLIFFE,
ISAIAH S. HYATT.